US011081998B2

(12) United States Patent
Seki et al.

(10) Patent No.: US 11,081,998 B2
(45) Date of Patent: Aug. 3, 2021

(54) CONTROLLER OF ROTARY ELECTRIC MACHINE

(71) Applicant: Mitsubishi Electric Corporation, Tokyo (JP)

(72) Inventors: Tomohiro Seki, Tokyo (JP); Ryo Nakamura, Tokyo (JP); Yuya Hisano, Tokyo (JP); Masahiro Iezawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/761,515

(22) PCT Filed: Jan. 10, 2018

(86) PCT No.: PCT/JP2018/000246
§ 371 (c)(1),
(2) Date: May 5, 2020

(87) PCT Pub. No.: WO2019/138454
PCT Pub. Date: Jul. 18, 2019

(65) Prior Publication Data
US 2020/0266748 A1 Aug. 20, 2020

(51) Int. Cl.
*H02P 27/04* (2016.01)
*H02P 27/08* (2006.01)
*H02P 21/22* (2016.01)
*H02P 25/22* (2006.01)

(52) U.S. Cl.
CPC .............. *H02P 27/08* (2013.01); *H02P 21/22* (2016.02); *H02P 25/22* (2013.01)

(58) Field of Classification Search
CPC ........... H02P 27/08; H02P 21/22; H02P 25/22
USPC ......................................................... 318/801
See application file for complete search history.

(56) References Cited

U.S. PATENT DOCUMENTS

| 2014/0246999 | A1* | 9/2014 | Kezobo ................. H02P 25/22 318/400.23 |
| 2018/0358915 | A1* | 12/2018 | Ishizuka ................. H02K 3/28 |
| 2019/0144028 | A1* | 5/2019 | Taki .......................... G06F 1/12 701/41 |

(Continued)

FOREIGN PATENT DOCUMENTS

JP 2012-200073 A 10/2012

*Primary Examiner* — Erick D Glass
(74) *Attorney, Agent, or Firm* — Sughrue Mion, PLLC; Richard C. Turner

(57) ABSTRACT

To provide a controller of rotary electric machine which can control voltage of each set of the winding appropriately within a range less than or equal to the DC power voltage, to the rotary electric machine which has plural sets of windings. A controller of rotary electric machine calculates, for each set, a required DC voltage which is a minimum DC power voltage required for applying a voltage according to the voltage command value to the winding, based on the voltage command value; calculates one common required DC voltage which is common to all sets, based on all sets of the required DC voltages; changes the common voltage control value so that the common required DC voltage approaches the DC power voltage; and changes each set of the current command value based on the common voltage control value.

9 Claims, 8 Drawing Sheets

(56) References Cited

U.S. PATENT DOCUMENTS

2019/0260324 A1\* 8/2019 Kuramitsu ........... B62D 5/0484
2019/0363664 A1\* 11/2019 Nakamura ........... B62D 5/0493

\* cited by examiner

CONTROLLER OF ROTARY ELECTRIC MACHINE

CROSS REFERENCE TO RELATED APPLICATIONS

This application is a National Stage of International Application No. PCT/JP2018/000246, filed Jan. 10, 2018.

TECHNICAL FIELD

The present disclosure relates to a controller of rotary electric machine which controls one rotary electric machine which has plural sets of windings via switching devices.

BACKGROUND ART

Recently, from a viewpoint of requirement of improvement in fuel efficiency of vehicle and adaptation to environmental standards, vehicle which mounts an internal combustion engine and other driving force sources such as a rotary electric machine has been developed.

In such a vehicle, so-called idling stop that stops the internal combustion engine at the stop of vehicle and restarts it at the vehicle start, and torque assist of the internal combustion engine during traveling are performed. Such a rotary electric machine for vehicle is required to operate with high efficiency in a wide rotational speed region from a high torque low rotation region at the vehicle start to a middle and low torque high rotation region at the assistance of the internal combustion engine. In order to realize this requirement, the synchronous rotary electric machine is used widely because of the feature of small size and high efficiency.

There are various kinds of synchronous rotary electric machines, such as the embedded magnet synchronous rotary electric machine in which the permanent magnet is embedded in the rotor, the surface magnet synchronous rotary electric machine in which the permanent magnet is stuck on the surface of the rotor, and the winding field synchronous rotary electric machine which generates magnetic flux by energizing current to the field winding provided in the rotor. Each of these synchronous rotary electric machines generates torque by generating magnetic flux in the rotor side, and energizing current to armature (stator) winding so as to be orthogonal to the magnetic flux generated in the rotor.

In this way, since the synchronous rotary electric machine has magnet magnetic flux or field magnetic flux, the induced voltage is generated in the armature winding according to its rotational speed. When the induced voltage becomes high and exceeds the DC power voltage, it becomes impossible to flow current through the armature winding, and generation of torque becomes impossible.

In order to prevent this, the so-called magnetic flux weakening control is employed. This magnetic flux weakening control is a control that suppresses the induced voltage generated in the armature winding, and prevents voltage saturation, by flowing current to the armature winding so as to weaken the magnetic flux generated in the rotor (that is, negative direction of d-axis) in the magnetic flux direction (generally called d-axis) generated by the rotor.

PLT 1 discloses the technology of performing the magnetic flux weakening control that prevent the induced voltage generated in the armature winding from exceeding the DC power voltage, by changing the voltage shortage ratio VR so that the modulation rate MI which is a ratio of the effective value of the three-phase AC voltages with respect to the DC power voltage approaches the maximum modulation rate MM, and changing the current command value according to the voltage shortage ratio VR.

CITATION LIST

Patent Literature

PLT 1: JP 2012-200073 A

SUMMARY OF INVENTION

Technical Problem

By the way, in such a rotary electric machine for vehicle, the three-phase winding is generally used as the armature winding in many cases. In order to energize current to the armature winding and generate torque, it is necessary to switch each phase of the armature winding at high speed to generate the rotating magnetic field. In this way, in the case where the armature winding is connected and shut off at high frequency, the magnetic flux generated by the armature also fluctuates at high frequency, and a magnetic sound with the same high frequency is generated.

In order to solve this problem, the technology for reducing the magnetic sound significantly by providing plural sets of three-phase windings in the same stator core and operating so as to cancel magnetomotive forces generated in each set of the three-phase winding with each other among sets has been developed.

However, PLT 1 does not disclose a method for applying the magnetic flux weakening control to the rotary electric machine which has plural sets of the three-phase windings in the stator in this way. If the technology of PLT 1 is applied to each set of the three-phase winding and each set of the current command value is controlled individually, combination pattern of control state of each set of the three-phase winding increases significantly, it is necessary to secure operation of all patterns, and control design becomes complicated. If each set of the current command value is controlled individually, interaction of the current command value among sets due to interaction of the magnetic coupling among sets occurs. Therefore, it is not easy to secure stability of operation behavior of the current command value.

In the winding field synchronous rotary electric machine, the induced voltage generated in the three-phase AC winding of the stator varies according to the magnetic flux generated by the field winding. Therefore, in order to perform the magnetic flux weakening control, it is necessary to change the DC voltage supplied to the field winding and the effective value of the AC voltages supplied to the three-phase winding of the stator in conjunction with each other. However, PLT 1 does not disclose a method for applying the magnetic flux weakening control to the winding field synchronous rotary electric machine which has plural sets of windings of the field winding and the stator winding.

Since the technology of PLT 1 controls based on the modulation rate, if maximum modulation rates are different to each other among plural sets of the three-phase windings, there was a problem that it is difficult to control with cooperation among sets. Since especially control methods are different between the field winding to which the DC voltage is supplied and the three-phase winding to which the AC voltage is supplied, control using the modulation rate is not appropriate.

Thus, it is desirable to provide a controller of rotary electric machine which can control voltage of each set of the winding appropriately within a range less than or equal to the DC power voltage, to the rotary electric machine which has plural sets of windings.

Solution to Problem

A controller of rotary electric machine according to the present disclosure is a controller of rotary electric machine which controls one rotary electric machine which has plural sets of windings via switching devices, the controller of rotary electric machine including:
  a current detection unit that, for each set, detects a current flowing into the winding;
  a current command calculation unit that, for each set, calculates a current command value flowing into the winding;
  a voltage command calculation unit that, for each set, calculates a voltage command value applied to the winding, based on the current command value and a current detection value;
  a switching control unit that, for each set, controls on/off the switching device, based on the voltage command value; and
  a voltage control value calculation unit that calculates, for each set, a required DC voltage which is a minimum DC power voltage required for applying a voltage according to the voltage command value to the winding, based on the voltage command value, calculates one common required DC voltage which is common to all sets, based on all sets of the required DC voltages, and changes a common voltage control value so that the common required DC voltage approaches a DC power voltage supplied to the switching devices,
  wherein the current command calculation unit changes each set of the current command value, based on the common voltage control value.

Advantage of Invention

According to the controller of rotary electric machine of the present disclosure, since the required DC voltage on the basis of the DC power voltage is calculated for each set of the winding, it becomes easy to perform control with cooperation among sets. Then, since the common voltage control value is changed so that the common required DC voltage approaches the DC power voltage, and each set of the current command value is changed by the common voltage control value, each set of the required DC voltage can be prevented from exceeding the DC power voltage, current is normally flowed through each set of the three-phase winding, and occurrence of torque fluctuation can be suppressed. Since the common voltage control value is changed by the common required DC voltage for all sets, and each set of the current command value is changed by the common voltage control value in conjunction with each other, combination pattern of control state of each set of the winding can be limited to predetermined combination pattern, security of operation becomes easy, and control design can be simplified. Since each set of the current command value is changed by the common voltage control value in conjunction with each other, influence due to interaction of magnetic coupling among sets can be limited to the predetermined pattern, and it becomes easy to secure stability of operation behavior of the current command value. Therefore, voltage of each set of the winding can be controlled appropriately within the range less than or equal to the DC power voltage, to the rotary electric machine which has plural sets of windings.

DETAILED DESCRIPTION OF THE EMBODIMENTS

1. Embodiment 1

Figure 1:
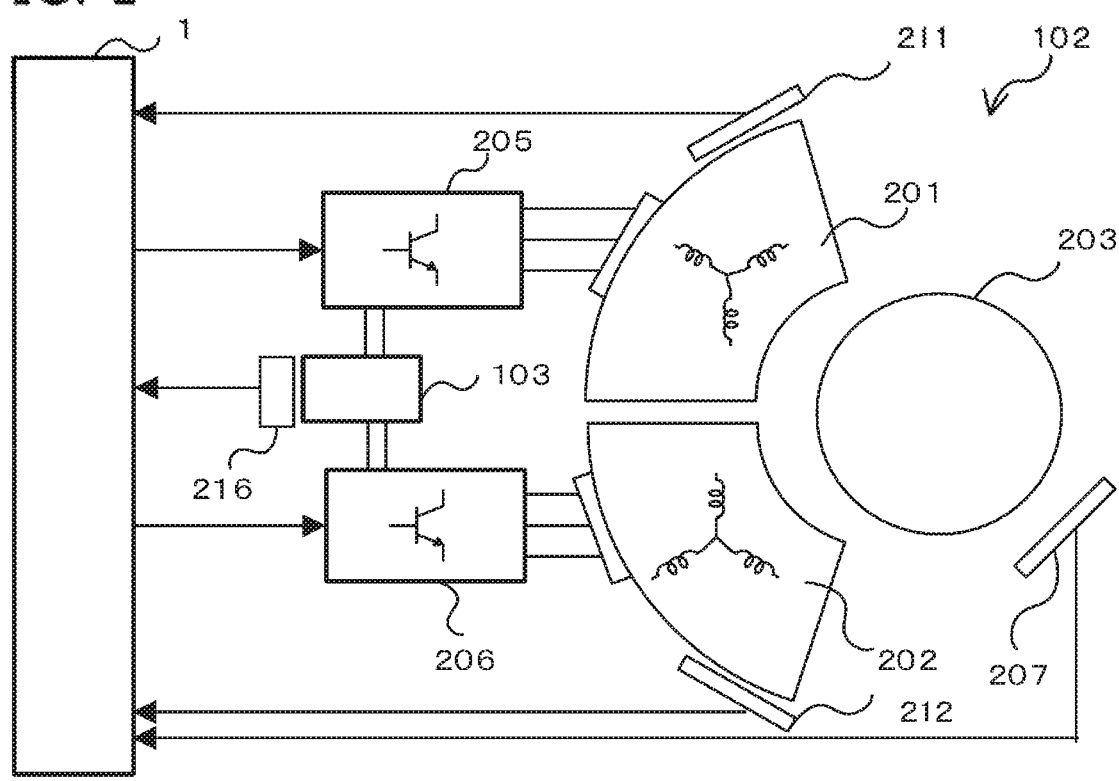
FIG. 1 is a schematic configuration diagram of the controller of rotary electric machine and the rotary electric machine according to Embodiment 1 of the present disclosure.
Figure 2:
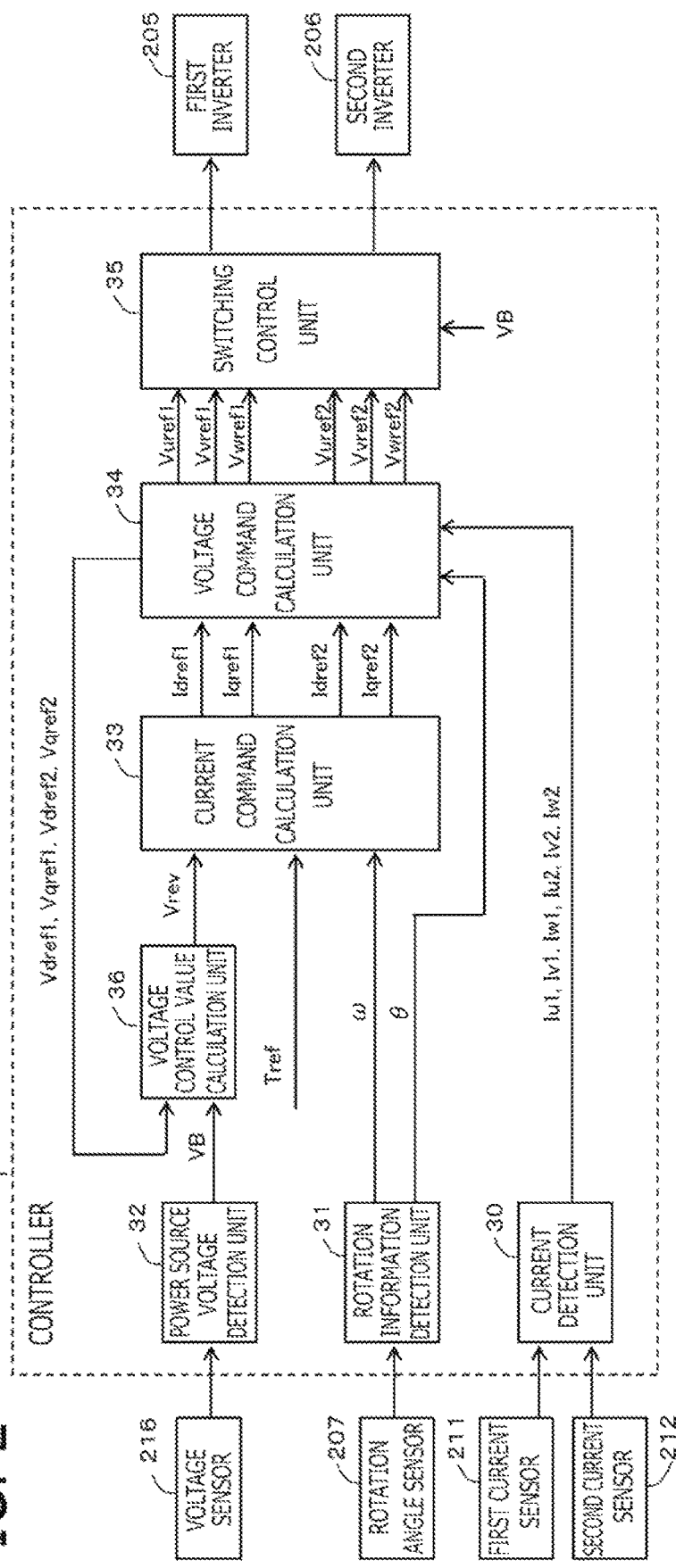
FIG. 2 is a block diagram of the controller of rotary electric machine according to Embodiment 1 of the present disclosure.

A controller 1 of rotary electric machine (hereinafter, referred to simply as the controller 1) according to Embodiment 1 will be explained with reference to drawings. FIG. 1 is a schematic configuration diagram of a rotary electric machine 102 and the controller 1 according to Embodiment 1. FIG. 2 is a block diagram of the controller 1.

1-1. Configuration of Rotary Electric Machine 102

The rotary electric machine 102 is one rotary electric machine which has plural sets of windings. In the present embodiment, the plural sets of windings is plural sets of three-phase windings provided in a stator of the rotary electric machine 102. Number of sets is two sets. Hereinafter, the first set is referred to as "first" and the second set is referred to as "second". A first three-phase winding 201 and a second three-phase winding 202 are wound around the stator (armature). The rotary electric machine 102 is a permanent magnet synchronous rotary electric machine in which the permanent magnet is provided in the rotor 203. Accordingly, two sets of three-phase windings 201, 202 are provided in the one stator, and the permanent magnet is provided in the one rotor 203 disposed at the radial-direction inner side of the stator.

An axial-direction position where the first three-phase winding 201 is wound around the stator and an axial-direction position where the second three-phase winding 202 is wound around the stator are overlapped to each other. Accordingly, a rotating magnetic field generated by each set of the three-phase winding provided in the one stator acts on the permanent magnet provided in the one rotor 203, and a magnetic field generated by the permanent magnet provided in the one stator acts on each set of the three-phase winding provided in the one stator.

A first inverter 205 which converts DC power supplied from a DC power source 103 into AC power and supplies to the first three-phase winding 201, and a second inverter 206 which converts DC power supplied from the DC power source 103 into AC power and supplies to the second three-phase winding 202 are provided.

Each of the first and the second inverters 205, 206 is provided with a plurality of switching devices. Each set of the inverter is provided with three sets of a series circuit where a positive electrode side switching device connected to the positive electrode terminal of the DC power source 103 and a negative electrode side switching device connected to the negative electrode terminal of the DC power source 103 are connected in series, corresponding to respective phase of the three-phase winding. A connection node of two switching devices in each series circuit is connected to the winding of the corresponding phase. MOSFET (Metal Oxide Semiconductor Field Effect Transistor), IGBT (Insulated Gate Bipolar Transistor) in which a diode is connected in reversely parallel, and the like is used for the switching devices.

A gate terminal of each switching device is connected to the controller 1 via a gate drive circuit and the like. Accordingly, each switching device is turned on or off by first switching control signal or second switching control signal outputted from the controller 1.

An electricity accumulation device, such as a lead battery and a lithium ion battery, is used for the DC power source 103. A DC-DC converter which is a DC electric power converter which steps up or steps down the DC voltage may be provided in the DC power source 103.

A first current sensor 211 for detecting current which flows into the first three-phase winding 201 and a second current sensor for detecting current which flows into the second three-phase winding 202 are provided. Output signals of the first and the second current sensors 211, 212 are inputted into the controller 1. In the present embodiment, the first and the second current sensors 211, 212 are provided on each phase wire which connects the series circuit of the switching devices and the winding.

The rotary electric machine 102 is provided with a rotation angle sensor 207, such as a resolver and a rotary encoder, for detecting a rotational angle (magnetic pole position) of the rotor 203. An output signal of the rotation angle sensor 207 is inputted into the controller 1. A voltage sensor 216 for detecting a DC power voltage VB of the DC power source 103 supplied to the first and the second inverters 205, 206 is provided. An output signal of the voltage sensor 216 is inputted into the controller 1.

In the present embodiment, the rotary electric machine 102 and the controller 1 are mounted on a vehicle. A rotary shaft of the rotary electric machine 102 is connected to a crankshaft of an internal combustion engine via a shaft or a pulley and belt mechanism. The rotary electric machine 102 has a function as a motor to start or assist the internal combustion engine, and has a function as a generator which generates electricity using the driving force of the internal combustion engine.

1-2. Configuration of Controller 1

Figure 3:
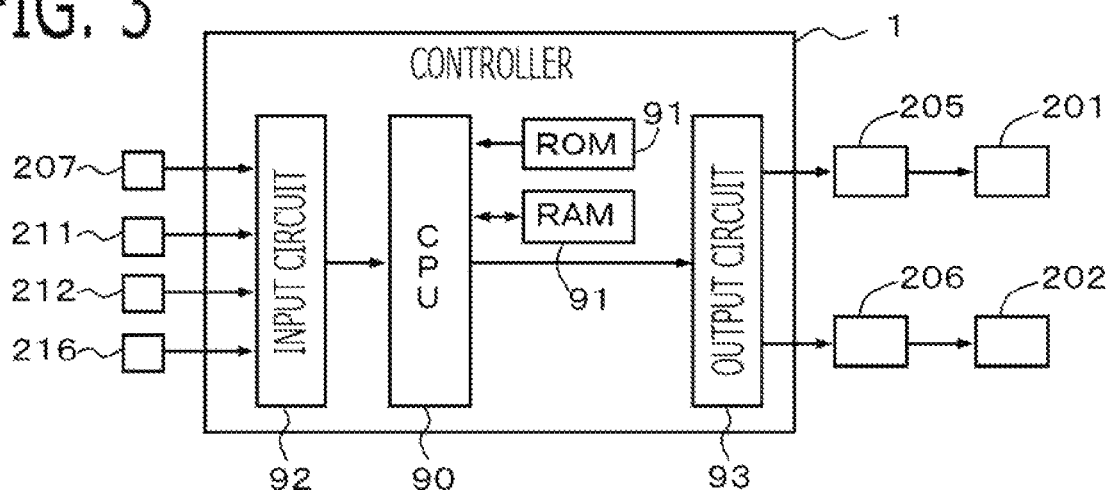
FIG. 3 is a hardware configuration diagram of the controller of rotary electric machine according to Embodiment 1 of the present disclosure.

The controller 1 controls the rotary electric machine 102 via the switching devices of the first and the second inverters 205, 206. As shown in FIG. 2, the controller 1 is provided with functional parts of a current detection unit 30, a rotation information detection unit 31, a power source voltage detection unit 32, a current command calculation unit 33, a voltage command calculation unit 34, a switching control unit 35, a voltage control value calculation unit 36, and the like, mentioned below. Each function of the controller 1 is realized by processing circuits provided in the controller 1. Specifically, as shown in FIG. 3, the controller 1 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. The input circuit 92 is connected with various kinds of sensors and switches such as the current sensors 211, 212, the rotation angle sensor 207, and the voltage sensor 216, and is provided with A/D converter and the like for inputting output signals from the sensors and the switches to the arithmetic processor 90. The output circuit 93 is connected with electric loads such as a gate drive circuit which drive on and off of the switching devices of the first and the second inverters 205, 206, and is provided with driving circuit and the like for outputting a control signal from the arithmetic processor 90.

Then, the arithmetic processor 90 runs software items (programs) stored in the storage apparatus 91 such as a ROM and collaborates with other hardware devices in the controller 1, such as the storage apparatus 91, the input circuit 92, and the output circuit 93, so that the respective functions of the control units 30 to 36 provided in the controller 1 are realized. Setting data items such as an upper limit value Vmax, a lower limit value Vmin, a maximum voltage utilization factor, and map data to be utilized in the control units 30 to 36 are stored, as part of software items (programs), in the storage apparatus 91 such as a ROM. Each function of the controller 1 will be described in detail below.

1-2-1. Current Detection Unit 30

The current detection unit 30, for each set, detects a current which flows into the winding. In the present embodiment, the current detection unit 30 detects first three-phase currents Iu1, Iv1, Iw1 which flow into the first three-phase winding 201, based on the output signal of the first current sensor 211, and detects second three-phase currents Iu2, Iv2, Iw2 which flow into the second three-phase winding 202, based on the output signal of the second current sensor 212.

1-2-2. Rotation Information Detection Unit 31

The rotation information detection unit 31 detects a rotational angle θ(a magnetic pole position θ) and a rotational speed w of the rotor 203. In the present embodiment, the rotation information detection unit 31 detects the rotational angle θ (the magnetic pole position θ) and the rotational speed ω based on the output voltage of the rotation angle sensor 207.

1-3-2. Power Source Voltage Detection Unit 32

The power source voltage detection unit 32 detects a DC power voltage VB of the DC power source 103. In the present embodiment, the power source voltage detection unit 32 detects the DC power voltage VB based on the output voltage of the voltage sensor 216.

1-2-4. Current Command Calculation Unit 33

The current command calculation unit 33, for each set, calculates the current command value flowing to the winding, and changes each set of the current command value based on a common voltage control value Vrev described below. In the present embodiment, the current command calculation unit 33 calculates a d-axis current command value and a q-axis current command value which expressed each set of the current command value in a dq-axis rotating coordinate system. The dq-axis rotating system consists of a d-axis defined in the magnetic pole position of the rotor 203 (direction of the N pole of magnet) and a q-axis defined in the direction advanced to d-axis by 90 degrees in an electrical angle, and which is the two-axis rotating coordinate system which rotates synchronizing with rotation of the rotor 203 in the electrical angle. The current command calculation unit 33 calculates a first d-axis current command value Idref1 and a first q-axis current command value Iqref1 for the first three-phase winding 201, and calculates a second d-axis current command value Idref2 and a second q-axis current command value Iqref2 for the second three-phase winding 202.

The current command calculation unit 33 calculates each set of dq-axis current command values so as to make the rotary electric machine 102 output torque of the torque command value Tref. The torque command value Tref may be calculated by the current command calculation unit 33, or may be transmitted from an external controller such as an integrated controller of vehicle.

<Theoretical Concept of Current Vector Control Method>

Figure 4:
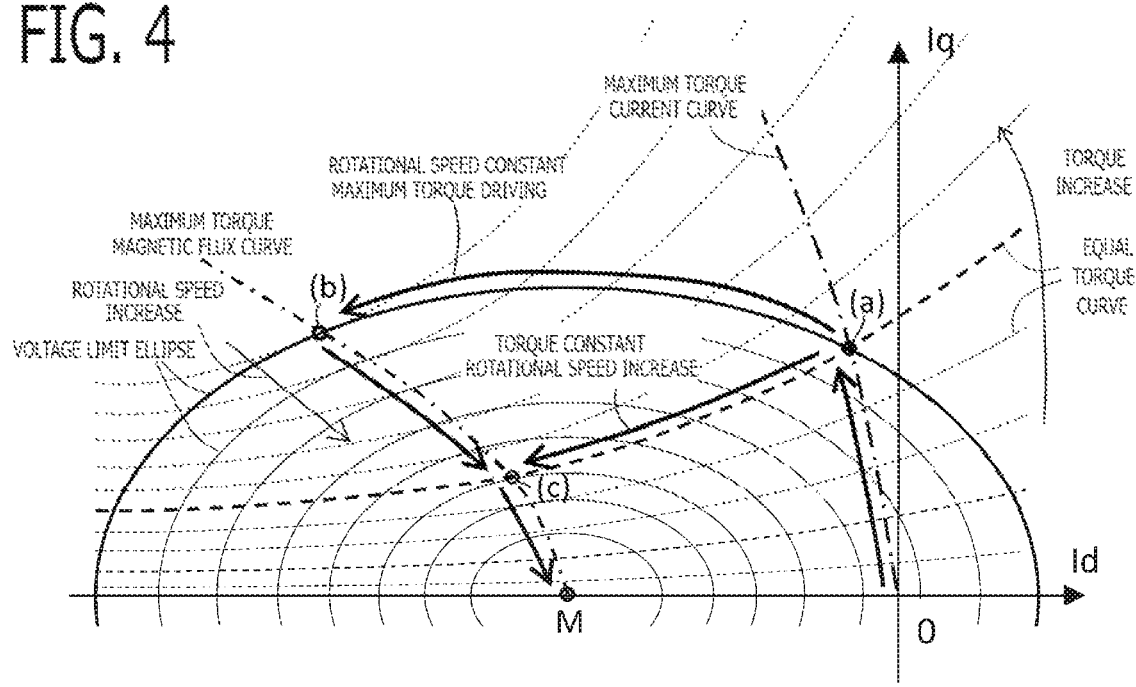
FIG. 4 is a figure for explaining a theoretical concept of a current vector control method according to Embodiment 1 of the present disclosure.

With reference to FIG. 4, theoretical concept of current vector control method for calculating dq-axis current command values will be explained. Until the dq-axis current command value is limited to a voltage limit ellipse, the dq-axis current command values are calculated according to concept of the maximum torque current control. The maximum torque current control is a control method which calculates the dq-axis current command values which maximizes a generated torque for the same current. As the torque command value Tref increases from 0, the q-axis current command value increases from 0 and the d-axis current command value decreases from 0, on the maximum torque current curve.

When the dq-axis current command values are limited to the voltage limit ellipse, the dq-axis current command values are calculated according to concept of the magnetic flux weakening control. In the magnetic flux weakening control, as the torque command value Tref increases, the dq-axis current command value changes on the voltage limit ellipse in a direction of decreasing the d-axis current command value. The voltage limit ellipse is a locus of the dq-axis current command values where terminal voltage (induced voltage) of the three-phase winding becomes equal to a voltage limiting value which is set less than or equal to the DC power voltage VB. The dq-axis current command values cannot be set outside of the voltage limit ellipse. As the voltage limiting value (DC power voltage VB) decreases, or the rotational speed ω increases, the voltage limit ellipse becomes narrow. In the concept of the magnetic flux weakening control, an intersection point of the voltage limit ellipse corresponding to the voltage limiting value and the rotational speed ω, and the equal torque curve corresponding to the torque command value Tref is calculated as the dq-axis current command values.

When the dq-axis current command values reach a maximum torque magnetic flux curve, the dq-axis current command values are calculated according to concept of the maximum torque magnetic flux control. The maximum torque magnetic flux control is a control method which calculates the dq-axis current command values which minimizes an interlinkage flux for the same torque. In the concept of the maximum torque magnetic flux control, an intersection point of the voltage limit ellipse and the maximum torque magnetic flux curve is calculated as the dq-axis current command values.

For example, as shown in FIG. 4, as the torque command value Tref increases from 0, the q-axis current command value increases from 0 and the d-axis current command value decreases from 0, on the maximum torque current curve. Then, when it reaches at the intersection point (a) of the maximum torque current curve and the voltage limit ellipse, the magnetic flux weakening control is started. After that, in the state where the voltage limiting value and the rotational speed w are constant and the voltage limit ellipse does not change, when the torque command value Tref increases, the equal torque curve shifts to the upper left, and the dq-axis current command values change on the voltage limit ellipse to the upper left. Then, when the dq-axis current command values reach at the intersection point (b) of the voltage limit ellipse and the maximum torque magnetic flux curve, the dq-axis current command values are limited to the maximum torque magnetic flux curve.

On the other hand, after reaching at the intersection point (a), while the torque command value Tref is constant, when the rotational speed ω increases, the voltage limit ellipse becomes narrow and the dq-axis current command values change on the equal torque curve to the lower left. Then, when the dq-axis current command values reach at the intersection point (c) of the equal torque curve and the maximum torque magnetic flux curve, the dq-axis current command values are limited to the maximum torque magnetic flux curve.

When the rotational speed w increases from the state of the intersection point (b) or the intersection point (c), the voltage limit ellipse becomes narrow, the dq-axis current command values change on the maximum torque magnetic flux curve to the lower right, and finally converge to M point, and torque becomes zero. The M point is the center point of the voltage limit ellipse.

<Calculation Method Using Common Voltage Control Value Vrev Instead of Voltage Limit Ellipse>

However, in the theoretical concept of the current vector control method explained until now, it is necessary to calculate the intersection point of the voltage limit ellipse and each curve (the maximum torque current curve, the equal torque curve, or the maximum torque magnetic flux curve), and there is a problem that calculation of the dq-axis current command values is complicated. Then, in the present embodiment, without calculating the intersection point of the voltage limit ellipse and each curve, by changing the common voltage control value Vrev by feedback control so that the common required DC voltage Vnecm which is calculated based on the voltage command value and which is described below approaches the DC power voltage VB, the dq-axis current command values are consequently coincided with the intersection point of the voltage limit ellipse and each curve.

In the present embodiment, the current command calculation unit 33 calculates first dq-axis current command values Idref1, Iqref1, and second dq-axis current command values Idref2, Iqref2, based on the torque command value Tref and the common voltage control value Vrev. Specifically, by referring to a first map data in which a relationship among the torque command value Tref, the common voltage control value Vrev, and the first dq-axis current command values Idref1, Iqref1 are preliminarily set, the current command calculation unit 33 calculates the first dq-axis current command values Idref1, Iqref1 corresponding to the present torque command value Tref and the present common voltage control value Vrev. By referring to a second map data in which a relationship among the torque command value Tref, the common voltage control value Vrev, and the dq-axis current command values Idref2, Iqref2 are preliminarily set, the current command calculation unit 33 calculates the second dq-axis current command values Idref2, Iqref2 corresponding to the present torque command value Tref and the present common voltage control value Vrev.

Figure 5:
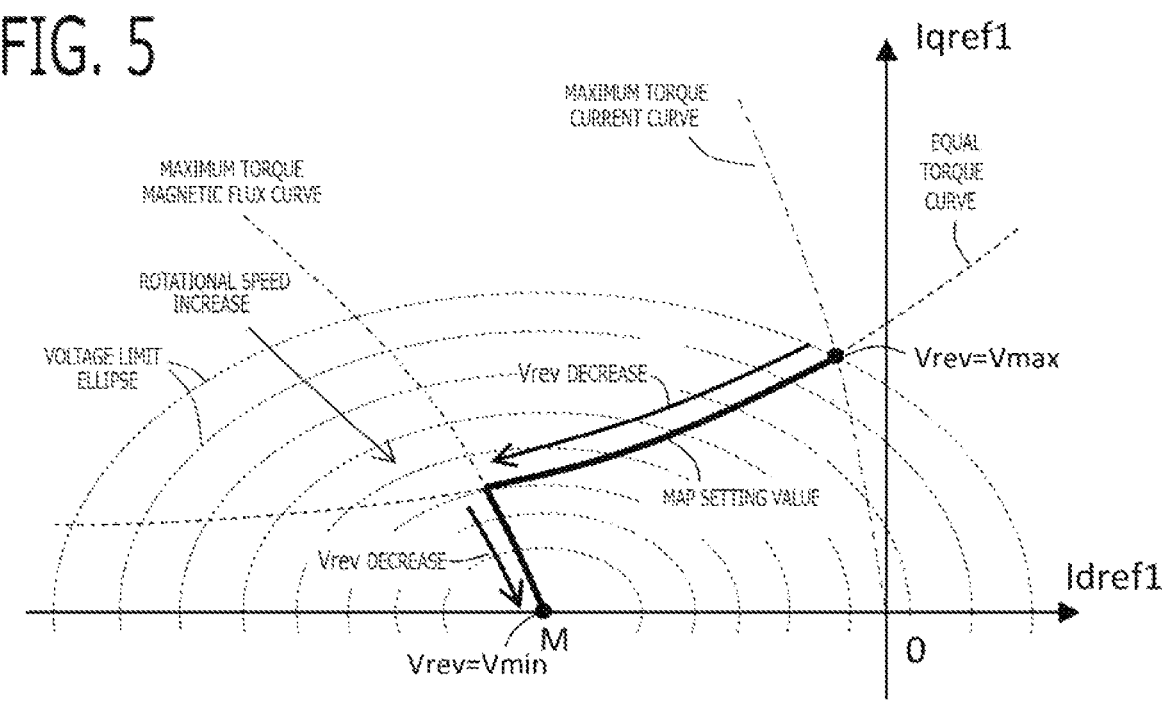
FIG. 5 is a figure for explaining the setting value of the map data for calculating the dq-axis current command values according to the common voltage control value according to Embodiment 1 of the present disclosure.

FIG. 5 shows an example of setting values of the first and the second map data when the torque command value Tref is a certain constant value. When the common voltage control value Vrev is the upper limit value Vmax (in this example, 0), the dq-axis current command values are set to an intersection point of the maximum torque current curve and the equal torque curve. As the common voltage control value Vrev decreases from the upper limit value Vmax, the dq-axis current command values are set so as to change on the equal torque curve to the lower left. When the dq-axis current command values change on the equal torque curve to the lower left, the induced voltage (terminal voltage) of the three-phase winding decreases, and the required DC voltage described below decreases. Accordingly, when the common voltage control value Vrev decreases, the current command calculation unit 33 changes the dq-axis current command values to a side where the required DC voltage decreases. On the contrary, when the common voltage control value Vrev increases, the current command calculation unit 33 changes the dq-axis current command values to a side where the required DC voltage increases.

Then, when the dq-axis current command values change on the equal torque curve to the lower left and reach the maximum torque magnetic flux curve, as the common voltage control value Vrev decreases, the dq-axis current command values are set so as to change on the maximum torque magnetic flux curve to the lower right until it reaches the M point. At the M point, the common voltage control value Vrev becomes the lower limit value Vmin. When the dq-axis current command values change on the maximum torque magnetic flux curve to the lower right, the induced voltage (terminal voltage) of the three-phase winding decreases, and the required DC voltage described below decreases. Accordingly, when the common voltage control value Vrev decreases, the current command calculation unit 33 changes the dq-axis current command values to a side where the required DC voltage decreases.

Data like the example of FIG. 5 is set to each of a plurality of the torque command values Tref. When the torque command Tref is a negative value, the q-axis current command value becomes a negative value, but the change tendency of the current command value is similar to that of the case where the torque command Tref is a positive value. If electromagnetic characteristics have characteristics reversed between positive and negative of the q-axis current, data reversed between positive and negative of the q-axis of FIG. 5 may be set.

Then, as described later, by changing the common voltage control value Vrev so that the common required DC voltage Vnecm approaches the DC power voltage VB, the maximum torque current control, and the magnetic flux weakening control or the maximum torque magnetic flux control can be switched automatically, and in the magnetic flux weakening control or the maximum torque magnetic flux control, the dq-axis current command values can be automatically coincided with the intersection point of the voltage limit ellipse, and the equal torque curve or the maximum torque magnetic flux curve.

Since the electric characteristics of the rotary electric machine change according to change of the rotational speed ω, in the present embodiment, the first and the second map data are provided for each of a plurality of the rotational speeds ω, the current command calculation unit 33 calculates the first and the second dq-axis current command values with reference to the first and the second map data which are close to the present rotational speed ω.

1-2-5. Voltage Command Calculation Unit 34

The voltage command calculation unit 34, for each set, calculates the voltage command value applied to winding, based on the current command value and the current detection value. In the present embodiment, the voltage command calculation unit 34, for each set, calculates the voltage command values of three-phase AC applied to the three-phase winding, based on the current command value and the current detection value. In detail, for each set, the voltage command calculation unit 34 changes the dq-axis voltage command values so that the dq-axis current detection values which expressed the current detection values of the three-phase winding in the dq-axis rotating coordinate system approaches the dq-axis current command values, and converts the dq-axis voltage command values into the voltage command values of three-phase AC.

<Dq-Axis Current Detection Values>

The voltage command calculation unit 34 calculates a first d-axis current detection value Id1 and a first q-axis current detection value Iq1, by performing a three-phase/two-phase conversion and a rotating coordinate conversion to the first three-phase currents detection values Iu1, Iv1, Iw1, based on the magnetic pole position θ. Similarly, the voltage command calculation unit 34 calculates a second d-axis current detection value Id2 and a second q-axis current detection value Iq2, by performing the three-phase/two-phase conversion and the rotating coordinate conversion to the second three-phase currents detection values Iu2, Iv2, Iw2, based on the magnetic pole position θ.

<Current Feedback Control>

Then, as shown in an equation (1), the voltage command calculation unit 34 changes a first d-axis voltage command value Vdref1 and a first q-axis voltage command value Vqref1 by PI control and the like so that the first dq-axis current detection values Id1, Iq1 approach the first dq-axis current command values Idref1, Iqref1.

$$\begin{bmatrix} Vdref1 \\ Vqref1 \end{bmatrix} = \begin{bmatrix} \left(Kpd + Kid\frac{1}{s}\right)(Idref1 - Id1) \\ \left(Kpq + Kiq\frac{1}{s}\right)(Iqref1 - Iq1) \end{bmatrix} \quad (1)$$

Similarly, as shown in an equation (2), the voltage command calculation unit 34 changes a second d-axis voltage command value Vdref2 and a second q-axis voltage command value Vqref2 by PI control and the like so that the second dq-axis current detection values Id2, Iq2 approach the second dq-axis current command values Idref2, Iqref2.

$$\begin{bmatrix} Vdref2 \\ Vqref2 \end{bmatrix} = \begin{bmatrix} \left(Kpd + Kid\frac{1}{s}\right)(Idref2 - Id2) \\ \left(Kpq + Kiq\frac{1}{s}\right)(Iqref2 - Iq2) \end{bmatrix} \quad (2)$$

Where Kpd is a d-axis proportional gain, Kpq is a q-axis proportional gain, Kid is a d-axis integral gain, and Kiq is a q-axis integral gain. s is a Laplace operator.

<Voltage Command Values of Three-Phase AC>

The voltage command calculation unit 34 calculates first voltage command values Vuref1, Vvref1, Vwref1 of three-phase AC, by performing a fixed coordinate conversion and a two-phase/three-phase conversion to the first dq-axis voltage command values Vdref1, Vqref1, based on the magnetic pole position θ. Similarly, the voltage command calculation unit 34 calculates second voltage command values Vuref2, Vvref2, Vwref2 of three-phase AC, by performing the fixed coordinate conversion and the two-phase/three-phase conversion to the second dq-axis voltage command values Vdref2, Vqref2, based on the magnetic pole position θ.

1-2-6. Switching Control Unit 35

For each set, the switching control unit 35 performs PWM (Pulse Width Modulation) control which controls on/off the switching devices, based on the voltage command value. In the present embodiment, the switching control unit 35 compares each of the first voltage command values Vuref1, Vvref1, Vwref1 of three-phase AC with a carrier wave (a triangular wave) which have an amplitude of the DC power voltage VB and vibrates at a carrier frequency; and turns on the switching control signal when the AC voltage command value exceeds the carrier wave, and turns off the switching control signal when the AC voltage command value is below the carrier wave. The switching control unit 35 outputs each switching control signal to the gate terminal of the corresponding switching device of the first inverter 205. Similarly, the switching control unit 35 compares each of the second voltage command values Vuref2, Vvref2, Vwref2 of three-phase AC with the carrier wave, and turns on or turns off the switching control signal. The switching control unit 35 outputs each switching control signal to the gate terminal of the corresponding switching device of the second inverter 206.

1-2-7. Voltage Control Value Calculation Unit 36

<Principle Explanation>

If the current flowing into the three-phase winding increases by increase in the torque command value Tref, or if the rotational speed ω increases, the induced voltage generated in the three-phase winding increases, and the voltage command value applied to the three-phase winding increases. Accordingly, the required DC voltage which is the minimum DC power voltage required for applying a voltage of the voltage command value to the three-phase winding also increases. If the required DC voltage exceeds the actual DC power voltage VB, it becomes impossible to flow current through the three-phase winding normally, and torque fluctuation occurs. Therefore, when the required DC voltage exceeds the DC power voltage VB, the voltage command value and the required current voltage are lowered by operating the current command value so that the induced voltage generated in the three-phase winding decreases.

However, in the present embodiment, since the plural sets of three-phase windings are provided, the required DC voltage exists for each set of the three-phase winding. Therefore, it is necessary to prevent all sets of the required DC voltage from exceeding the DC power voltage VB. However, if the current command value is individually operated for each set so that each set of the required DC voltage does not exceed the DC power voltage VB, combination pattern of control state of each set of the three-phase winding increases significantly, it is necessary to secure operation of all patterns, and control design becomes complicated. If the current command value is individually operated for each set so that each set of the required DC voltage does not exceed the DC power voltage VB, interaction of the current command value among sets due to interaction of the magnetic coupling among sets occurs. Therefore, it is not easy to secure stability of operation behavior of the current command value.

<Calculation of Common Required DC Voltage Vnecm and Common Voltage Control Value Vrev>

Then, the voltage control value calculation unit 36 calculates, for each set, a required DC voltage which is a minimum DC power voltage required for applying a voltage according to the voltage command value to the winding, based on the voltage command value, and calculates one common required DC voltage Vnecm which is common to all sets, based on all sets of the required DC voltages. Then, the voltage control value calculation unit 36 changes a common voltage control value Vrev so that the common required DC voltage Vnecm approaches the DC power voltage VB.

According to this configuration, since the common voltage control value Vrev is changed so that the common required DC voltage Vnecm approaches the DC power voltage VB, and each set of the current command value is changed by the common voltage control value Vrev, each set of the required DC voltage set can be prevented from exceeding the DC power voltage VB, current is normally flowed through each set of the three-phase winding, and occurrence of torque fluctuation can be suppressed.

Since the common voltage control value Vrev is changed by the common required DC voltage Vnecm for all sets, and each set of the current command value is changed by the common voltage control value Vrev in conjunction with each other, combination pattern of control state of each set of the three-phase winding can be limited to predetermined combination pattern, security of operation becomes easy, and control design can be simplified. For example, it can be made to a simple control design which provides the first and the second map data in which the current command value is changed according to the common voltage control value Vrev.

Since each set of the current command value is changed by the common voltage control value Vrev in conjunction with each other, influence due to interaction of magnetic coupling among sets can be limited to the predetermined pattern, and it becomes easy to secure stability of operation behavior of the current command value.

In the present embodiment, the voltage control value calculation unit 36, for each set, calculates a line voltage effective value of the voltage command values of three-phase AC, and calculates the required DC voltage by dividing the line voltage effective value of the voltage command values of three-phase AC by a preliminarily set maximum voltage utilization factor.

Specifically, as shown in an equation (3), the voltage control value calculation unit 36, for first set, calculates a line voltage effective value of the first three-phase AC voltage command values, based on the first dq-axis voltage command values Vdref1, Vqref1, and calculates a first required DC voltage Vne1 by dividing the line voltage effective value by a preliminarily set first maximum voltage utilization factor Rmx1.

$$Vne1 = \frac{\sqrt{Vdref1^2 + Vqref1^2}}{Rmx1} \tag{3}$$

Similarly, as shown in the equation (4), the voltage control value calculation unit 36 calculates, for second set, a line voltage effective value of the second three-phase AC voltage command values, based on the second dq-axis voltage command values Vdref2, Vqref2, and calculates a second required DC voltage Vne2 by dividing the line voltage effective value by a preliminarily set second maximum voltage utilization factor Rmx2.

$$Vne2 = \frac{\sqrt{Vdref2^2 + Vqref2^2}}{Rmx2} \tag{4}$$

Herein, the first and the second maximum voltage utilization factors Rmx1, Rmx2 are preliminarily set to values corresponding to the PWM control method in the switching control unit 35. For example, when only the sine wave PWM control which compares the voltage command values of three-phase AC of sine wave with the carrier wave is performed, the maximum voltage utilization factor is set to 0.612. When the overmodulation PWM control (third harmonic wave injection, space vector modulation, two-phase modulation, and the like) which adds modulation to the voltage command values of three-phase AC of sine wave is performed, the maximum voltage utilization factor is set to 0.707. In order to lower the actually used DC voltage rather than the DC power voltage VB, the maximum voltage utilization factor may be set to a value smaller than 0.612 or 0.707.

The voltage control value calculation unit 36 calculates a maximum value in all sets of the required DC voltages, as the common required DC voltage Vnecm. Specifically, as shown in an equation (5), the voltage control value calculation unit 36 calculates a maximum value in the first required DC voltage Vne1 and the second required DC voltage Vne2, as the common required DC voltage Vnecm. Herein, MAX (A, B) is a function which outputs a larger value between A and B.

Vnecm=MAX(Vne1,Vne2) (5)

According to this configuration, the required DC voltage of set which becomes the maximum value can be prevented from exceeding the DC power voltage VB, and the required DC voltage of sets other than the maximum value can also be limited to less than or equal to the DC power voltage VB. Especially, for the set which becomes the maximum value, in region of the magnetic flux weakening control and the maximum torque magnetic flux control, the dq-axis current command values can be changed on the voltage limit ellipse.

Then, the voltage control value calculation unit 36 changes the common voltage control value Vrev so that the common required DC voltage Vnecm approaches the DC power voltage VB. In the present embodiment, as shown in an equation (6), the voltage control value calculation unit 36 changes the common voltage control value Vrev by PI control and the like, based on a deviation between the common required DC voltage Vnecm and the DC power voltage VB. Herein, Kp is a proportional gain of a positive value and Ki is an integral gain of a positive value.

$$Vrev = \left(Kp + Ki\frac{1}{s}\right)(VB - Vnecm) \tag{6}$$

When the common required DC voltage Vnecm exceeds the DC power voltage VB and the common voltage control value Vrev is decreased, as mentioned above, the current command calculation unit 33 changes the dq-axis current command values so that the induced voltage (terminal voltage) of the three-phase winding decreases and the required DC voltage decreases in region of the magnetic flux weakening control and the maximum torque magnetic flux control. Consequently, the common required DC voltage Vnecm decreases and approaches the DC power voltage VB. On the contrary, when the common required DC voltage Vnecm is below the DC power voltage VB and the common voltage control value Vrev is increased, as mentioned above, the current command calculation unit 33 changes the dq-axis current command values so that the induced voltage (terminal voltage) of the three-phase winding increases and the required DC voltage increases in region of the magnetic flux weakening control and the maximum torque magnetic flux control. Consequently, the common required DC voltage Vnecm increases and approaches the DC power voltage VB.

<Upper and Lower Limitation Processing, Anti Wind-Up Processing>

On the other hand, since the common required DC voltage Vnecm is always below the DC power voltage VB in region of the maximum torque current control, the common voltage control value Vrev continues increasing as it is. In region of the maximum torque magnetic flux control, since the common required DC voltage Vnecm always exceeds the DC power voltage VB after the dq-axis current command value reaches the M point, the common voltage control value Vrev continues decreasing as it is.

Then, in the present embodiment, as shown in an equation (7), the voltage control value calculation unit 36 upper and lower limits the common voltage control value Vrev by a upper limit value Vmax and a lower limit value Vmin which are preliminarily set. In the present embodiment, the upper limit value Vmax is set to a value (in this example, 0) of the common voltage control value Vrev when the dq-axis current command values become values on the maximum torque current curve (intersection point (a) of FIG. 4). The lower limit value Vmin is set to a value (in this example, a predetermined value smaller than 0) of the common voltage control value Vrev when the dq-axis current command values become the M point.

Vmin≤Vrev≤Vmax (7)

When upper-limiting the common voltage control value Vrev by the upper limit value Vmax or lower-limiting by the lower limit value Vmin, the voltage control value calculation unit 36 performs anti wind-up processing that does not change the common voltage control value Vrev. For example, when upper-limiting or lower-limiting the common voltage control value Vrev, the voltage control value calculation unit 36 stops update of the integral value of PI control of the equation (6).

Although the deviation is calculated by (VB−Vnecm) in the equation (6), the deviation may be calculated by (Vnecm−VB). In this case, change direction of the common voltage control value Vrev is reversed, the upper limit value Vmax corresponds to the M point, and the lower limit value Vmin corresponds to the point on the maximum torque current curve.

2. Embodiment 2

Figure 6:
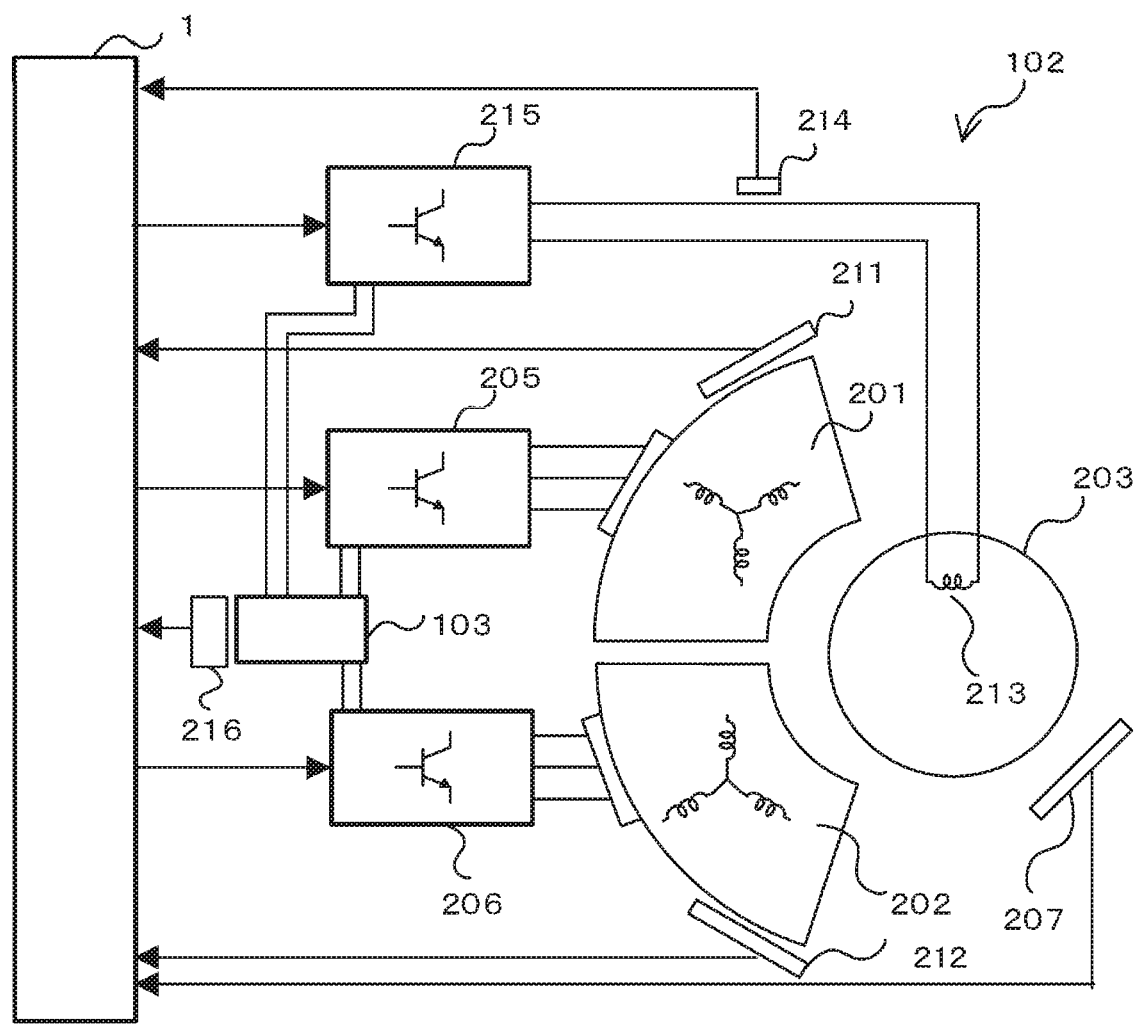
FIG. 6 is a schematic configuration diagram of the controller of rotary electric machine and the rotary electric machine according to Embodiment 2 of the present disclosure.
Figure 7:
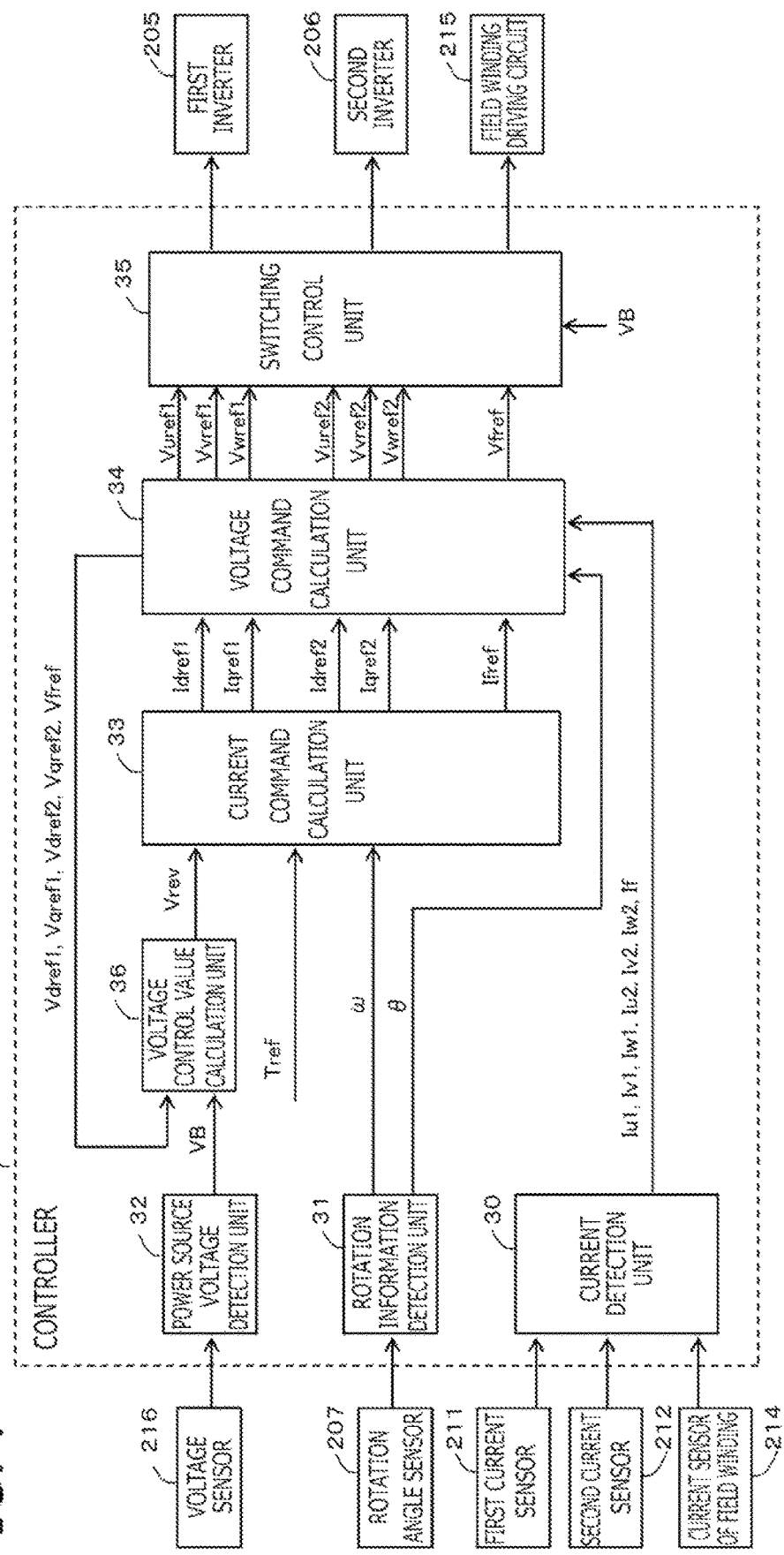
FIG. 7 is a block diagram of the controller of rotary electric machine according to Embodiment 2 of the present disclosure.

Next, the controller 1 according to Embodiment 2 will be explained. The explanation for constituent parts the same as those in Embodiment 1 will be omitted. FIG. 6 is a schematic configuration diagram of a rotary electric machine 102 and the controller 1 according to the present embodiment; and FIG. 7 is a block diagram of the controller 1. In the present embodiment, a field winding 213 is provided in the rotor 203 of the rotary electric machine 102, and the controller 1 controls voltage application to the field winding 213.

In the present embodiment, the plural sets of windings which the rotary electric machine 102 has are 1 set or plural sets (in this example, two sets) of the three-phase windings provided in the stator, and 1 set of the field winding 213 provided in the rotor 203. The rotary electric machine 102 is a winding field synchronous rotary electric machine in which the first three-phase winding 201 and the second three-phase winding 202 are provided in the stator, and the field winding 213 is provided in the rotor 203. The first three-phase winding 201 is first set of winding, the second three-phase winding 202 is second set of winding, and the field winding 213 is third set of winding.

In the present embodiment, in addition to the first inverter 205 and the second inverter 206, the field winding driving circuit 215 which controls supply of the DC power to the field winding 213 is provided. The field winding driving circuit 215 has a switching device. On the positive pole wire which connects the DC power source 103 and the field winding 213, the switching device of the field winding driving circuit 215 is provided, and turns on and off connection between the DC power source 103 and the field winding 213. The switching device of the field winding driving circuit 215 is turned on or turned off by a switching control signal of field winding outputted from the controller 1.

In addition to the first current sensor 211 and the second current sensor, a current sensor 214 of field winding for detecting a current which flows into the field winding 213 is provided. An output signal of the current sensor 214 of field winding is inputted into the controller 1. The current detection unit 30 detects a field current If which flows into the field winding 213 based on the output signal of the current sensor 214 of field winding.

<Current Command Calculation Unit 33>

The current command calculation unit 33, for each set, calculates the current command value flowing to the winding, and changes each set of the current command value based on the common voltage control value Vrev. In the present embodiment, the current command calculation unit 33 calculates a field current command value Ifref which is a current command value which flows into the field winding. The current command calculation unit 33 calculates the field current command value Ifref based on the torque command value Tref and the common voltage control value Vrev. Specifically, by referring to a map data of field winding in which a relationship among the torque command value Tref, the common voltage control value Vrev, and the field current command value Ifref are preliminarily set, the current command calculation unit 33 calculates the field current command value Ifref corresponding to the present torque command value Tref and the present common voltage control value Vrev. The map data of field winding is provided for each of a plurality of the rotational speeds ω, and the current command calculation unit 33 calculates the field current command value Ifref by referring to the map data of field winding close to the present rotational speed w.

As similar to Embodiment 1, the current command calculation unit 33 calculates the first dq-axis current command values Idref1, Iqref1, and the second dq-axis current command values Idref2, Iqref2, based on the torque command value Tref and the common voltage control value Vrev. Specifically, by referring to the first map data in which a relationship among the torque command value Tref, the common voltage control value Vrev, and the first dq-axis current command values Idref1, Iqref1 are preliminarily set, the current command calculation unit 33 calculates the first dq-axis current command values Idref1, Iqref1 corresponding to the present torque command value Tref and the present common voltage control value Vrev. By referring to the second map data in which a relationship among the torque command value Tref, the common voltage control value Vrev, and the dq-axis current command values Idref2, Iqref2 are preliminarily set, the current command calculation unit 33 calculates the second dq-axis current command values Idref2, Iqref2 corresponding to the present torque command value Tref and the present common voltage control value Vrev. The first and the second map data are provided for each of a plurality of the rotational speeds ω, the current command calculation unit 33 calculates the first and the second dq-axis current command values by referring to the first and the second map data which are close to the present rotational speed ω.

Figure 8:
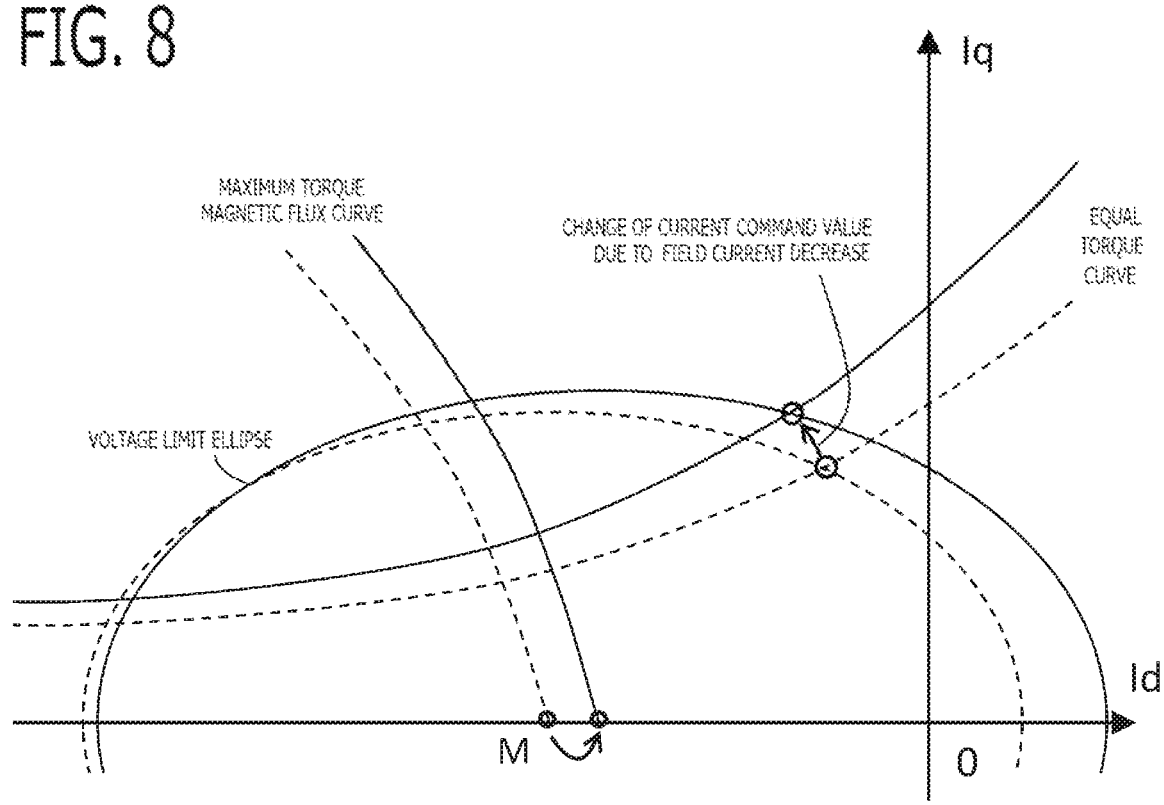
FIG. 8 is a figure for explaining a concept of setting of the dq-axis current command values according to change of the field current according to Embodiment 2 of the present disclosure.

In the present embodiment, the interlinkage flux (field current) of the field winding 213 changes according to operating condition of the torque command value Tref, the common voltage control value Vrev, and the rotational speed ω. As shown in FIG. 8, when the interlinkage flux (field current) of the field winding 213 decreases, the M point (center point) of the voltage limit ellipse moves to the positive direction on the d-axis, the voltage limit ellipse spreads and the equal torque curve shifts to the up side. Since the first and the second map data of the dq-axis current command values are set based on the torque command value Tref, the common voltage control value Vrev, and the rotational speed w as similar to the map data of the field current command value Ifref, these are preliminarily set so as to correspond to moving of the M point of the voltage limit ellipse, expansion and reduction of the voltage limit ellipse, shift of the equal torque curve, change of the maximum torque magnetic flux curve, and change of the maximum torque current curve, which are caused by change of the field current command value Ifref.

Figure 9:
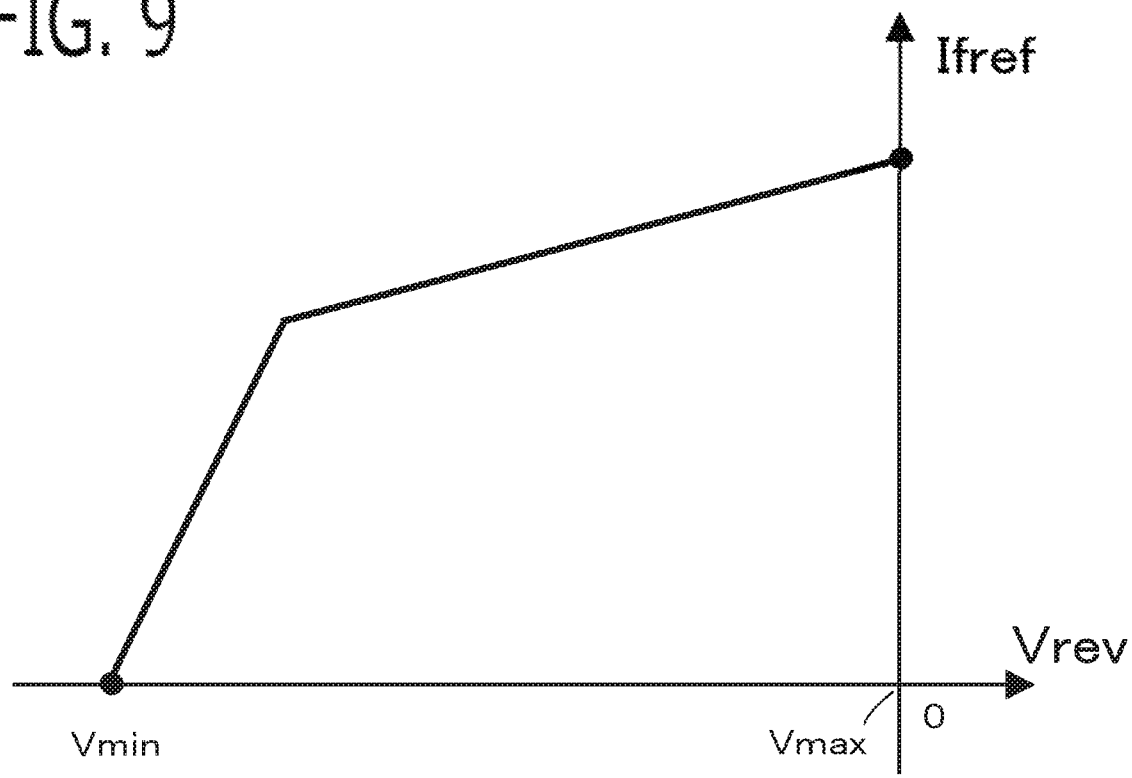
FIG. 9 is a figure for explaining the setting value of the map data for calculating the field current command value according to the common voltage control value according to Embodiment 2 of the present disclosure.

FIG. 9 shows an example of setting values of the map data of field winding when the torque command value Tref is a certain constant value. When the common voltage control value Vrev is the upper limit value Vmax (in this example, 0), the field current command value Ifref is set to a value according to the torque command value Tref. When the common voltage control value Vrev becomes smaller than the upper limit value Vmax, it becomes a region of the magnetic flux weakening control; and as the common voltage control value Vrev decreases from the upper limit value Vmax, the field current command value Ifref decreases and the magnetic flux of field winding is weakened. When the common voltage control value Vrev further decreases, it becomes a region of the maximum torque magnetic flux control; as the common voltage control value Vrev decreases, the field current command value Ifref decreases with gradient steeper than region of the magnetic flux weakening control; and when the common voltage control value Vrev reaches the lower limit value Vmin, the field current command value Ifref is set to 0.

Figure 10:
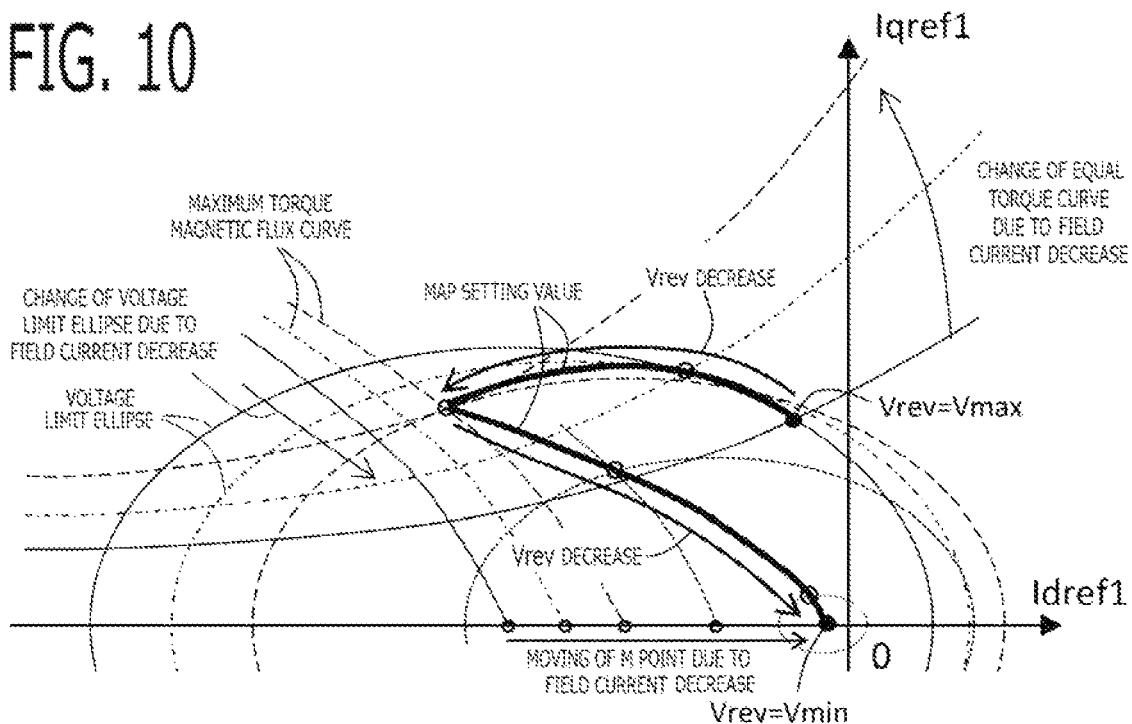
FIG. 10 is a figure for explaining the setting value of the map data for calculating the dq-axis current command values according to the common voltage control value according to Embodiment 2 of the present disclosure.

FIG. 10 shows an example of setting values of the first or the second map data when the torque command value Tref and the rotational speed ω are certain constant values and the field current command value Ifref is changed as shown in FIG. 9 with respect to change of the common voltage control value Vrev. When the common voltage control value Vrev is the upper limit value Vmax (in this example, 0), the dq-axis current command values are set to the intersection point (a) between the maximum torque current curve and the equal torque curve. When the common voltage control value Vrev becomes smaller than the upper limit value Vmax, it becomes a region of the magnetic flux weakening control; and as the common voltage control value Vrev decreases from the upper limit value Vmax, the field current command value Ifref decreases and then the equal torque curve shifts to the up side. Accordingly, the dq-axis current command values are set to change to left side on the equal torque curve which is shifted to the up side as the common voltage control value Vrev decreases from the upper limit value Vmax. Therefore, magnetic flux weakening by decrease in the d-axis current is also performed.

When the common voltage control value Vrev further decreases, it becomes a region of the maximum torque magnetic flux control; and as the common voltage control value Vrev decreases, the field current command value Ifref decreases to 0 gradually, and then the M point shifts to right side, and the maximum torque magnetic flux curve also shifts to right side. Even when the field current command value Ifref becomes the lower limit value Vmin and the field current command value Ifref becomes 0, magnetic flux remains in the iron core of the rotor 203, and then the M point becomes a predetermined position on the left side of 0 point. Accordingly, the dq-axis current command values are set to change to the lower right toward the M point when the field current command value Ifref is 0, on the maximum torque magnetic flux curve which shifts to right side as the common voltage control value Vrev decreases.

Therefore, when the common voltage control value Vrev is lower-limited by the lower limit value Vmin, the current command calculation unit 33 sets the field current command value Ifref to 0, and sets each set of the current command value of the three-phase winding (in this example, the dq-axis current command values) to a value corresponding to the center point (M point) of the voltage limit ellipse when the field winding current is 0.

<Voltage Command Calculation Unit 34>

The voltage command calculation unit 34, for each set, calculates the voltage command value applied to winding, based on the current command value and the current detection value. In the present embodiment, the voltage command calculation unit 34 calculates, for the field winding 213, a field voltage command value Vfref of one-phase DC applied to the field winding 213, based on the field current command value Ifref and the field current detection value If. In the present embodiment, the voltage command calculation unit 34 changes the field voltage command value Vfref so that the field current detection value If approaches the field current command value Ifref. For example, as shown in an equation (8), the voltage command calculation unit 34 changes the field voltage command value Vfref by PI control and the like, based on a deviation between the field current detection value If and the field current command value Ifref. Herein, Kpf is a proportional gain and Kif is an integral gain.

$$Vfref = \left(Kpf + Kif\frac{1}{s}\right)(Ifref - If) \tag{8}$$

The voltage command calculation unit 34 calculates, for each set of the three-phase winding, the voltage command values of the three-phase AC applied to the three-phase winding, based on the current command value and the current detection value. As similar to Embodiment 1, for each set, the voltage command calculation unit 34 changes the dq-axis voltage command values so that the dq-axis current detection values which expressed the current detection values of the three-phase winding in the dq-axis rotating coordinate system approaches the dq-axis current command values, and converts the dq-axis voltage command values into the voltage command values of three-phase AC.

<Switching Control Unit 35>

For each set, the switching control unit 35 performs PWM control which controls on/off the switching devices, based on the voltage command value. In the present embodiment, the switching control unit 35 generates a switching control signal that turns on and off at a duty ratio (Vfref/VB) obtained by dividing the field voltage command value Vfref by the DC power voltage VB, and outputs the switching control signal to the gate terminal of the switching device of the field winding driving circuit 215.

As similar to Embodiment 1, for each set of the three-phase winding, the switching control unit 35 compares each of the voltage command values of three-phase AC with the carrier wave, generates the switching control signal that turns on and off based on the comparison result, and outputs each switching control signal to the gate terminal of the switching device of the corresponding inverter.

<Voltage Control Value Calculation Unit 36>

The voltage control value calculation unit 36 calculates, for each set, the required DC voltage which is a minimum DC power voltage required for applying a voltage according to the voltage command value to the winding, based on the voltage command value and the DC power voltage VB, and calculates one common required DC voltage Vnecm which is common to all sets, based on all sets of the required DC voltages. Then, the voltage control value calculation unit 36 changes the common voltage control value Vrev so that the common required DC voltage Vnecm approaches the DC power voltage VB.

In the present embodiment, as shown in an equation (9), the voltage control value calculation unit 36 calculates, for the field winding 213, a required DC voltage Vnef of field winding by dividing the field voltage command value Vfref by a preliminarily set maximum voltage utilization factor Rmxf of field winding.

$$Vnef = \frac{Vfref}{Rmxf} \tag{9}$$

The maximum voltage utilization factor Rmxf of field winding is preliminarily set to 1, for example. In order to lower the actually used DC voltage rather than the DC power voltage VB, the maximum voltage utilization factor Rmxf of field winding may be set to a value smaller than 1.

As similar to Embodiment 1, the voltage control value calculation unit 36, for each set of the three-phase winding, calculates a line voltage effective value of the voltage command values of three-phase AC, and calculates the required DC voltage by dividing the line voltage effective value of the voltage command values of three-phase AC by a preliminarily set maximum voltage utilization factor.

The voltage control value calculation unit 36 calculates a maximum value in all sets of the required DC voltages, as the common required DC voltage Vnecm. Specifically, as shown in an equation (10), the voltage control value calculation unit 36 calculates a maximum value in the first required DC voltage Vne1, the second required DC voltage Vne2, and the required DC voltage Vnef of field winding, as the common required DC voltage Vnecm. Here, MAX (A, B, C) is a function which outputs the largest value among A, B, and C.

$$\text{Vnecm}=\text{MAX}(\text{Vne1},\text{Vne2},\text{Vnef}) \quad (10)$$

Then, as similar to Embodiment 1, the voltage control value calculation unit 36 changes the common voltage control value Vrev so that the common required DC voltage Vnecm approaches the DC power voltage VB.

In the case where the required DC voltage of the three-phase winding is set to the common required DC voltage Vnecm, when the common required DC voltage Vnecm exceeds the DC power voltage VB and the common voltage control value Vrev is decreased, the current command calculation unit 33 changes the dq-axis current command values and the field current command value Ifref so that the induced voltage (terminal voltage) of the three-phase winding decreases and the required DC voltage of the three-phase winding decreases in region of the magnetic flux weakening control and the maximum torque magnetic flux control. Consequently, the common required DC voltage Vnecm decreases and approaches the DC power voltage VB.

In the case where the required DC voltage Vnef of field winding is set to the common required DC voltage Vnecm, when the common required DC voltage Vnecm exceeds the DC power voltage VB and the common voltage control value Vrev is decreased, the current command calculation unit 33 decreases the field current command value Ifref, and decreases the required DC voltage Vnef of field winding. The dq-axis current command values are also changed by decrease of the common voltage control value Vrev in conjunction with each other, and can be corresponded to the changed field current command value Ifref.

For example, even when the DC power voltage VB drops due to drop of the charge amount of the electricity accumulation device and the like, the field current command value Ifref and each set of the current command value of the three-phase winding are changed by the common voltage control value Vrev in conjunction with each other, the required DC voltage Vnef of field winding and each set of the required DC voltage of the three-phase winding can be prevented from exceeding the DC power voltage VB, and the rotary electric machine can be operated appropriately.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the plural sets of windings which the rotary electric machine 102 has are 2 sets of three-phase windings provided in the stator of the rotary electric machine 102. However, embodiments of the present disclosure are not limited to the foregoing case. That is to say, the plural sets of windings may be greater than or equal to 3 sets of the three-phase windings provided in the stator of the rotary electric machine 102.

(2) In the above-mentioned Embodiment 2, there has been explained the case where the plural sets of windings which the rotary electric machine 102 has are 2 sets of the three-phase windings provided in the stator, and 1 set of the field winding 213 provided in the rotor 203. However, embodiments of the present disclosure are not limited to the foregoing case. That is to say, the plural sets of windings may be 1 set or greater than or equal to 3 sets of the three-phase windings provided in the stator, and 1 set of field winding 213 provided in the rotor 203.

(3) In each of the above-mentioned Embodiments, there has been explained the case where the current command calculation unit 33 calculates the first dq-axis current command values Idref1, Iqref1 with reference to the first map data, and calculates the second dq-axis current command values Idref2, Iqref2 with reference to the second map data. However, embodiments of the present disclosure are not limited to the foregoing case. For example, if the characteristics of the first three-phase winding 201 and the second three-phase winding 202 are the same, the first map data and the second map data may be made common. That is to say, by referring to a common map data in which a relationship among the torque command value Tref, the common voltage control value Vrev, and the dq-axis current command values is preliminarily set, the current command calculation unit 33 may calculate the dq-axis current command values corresponding to the present torque command value Tref and the present common voltage control value Vrev, as the first dq-axis current command values Idref1, Iqref1, and the second dq-axis current command values Idref2, Iqref2.

Various modifications and alterations of this disclosure will be apparent to those skilled in the art without departing from the scope and spirit of this disclosure, and it should be understood that this is not limited to the illustrative embodiments set forth herein.

REFERENCE SIGNS LIST

1 Controller of rotary electric machine, 30 Current detection unit, 31 Rotation information detection unit, 32 Power source voltage detection unit, 33 Current command calculation unit, 34 Voltage command calculation unit, 35 Switching control unit, 36 Voltage control value calculation unit, 102 Rotary electric machine, 103 DC power source, 201 First three-phase winding, 202 Second three-phase winding, 205 First inverter, 206 Second inverter, 207 Rotation angle sensor, 211 First current sensor, 212 Second current sensor, 213 Field winding, 214 Current sensor of field winding, 215 Field winding driving circuit, 216 Voltage sensor, Id1 First d-axis current detection value, Iq1 First q-axis current detection value, Id2 Second d-axis current detection value, Iq2 Second q-axis current detection value, Idref1 First d-axis current command value, Iqref1 First q-axis current command value, Idref2 Second d-axis current command value, Iqref2 Second q-axis current command value, If Field current detection value, Ifref Field current command value, Rmx1 First maximum voltage utilization factor, Rmx2 Second maximum voltage utilization factor, Rmxf Maximum voltage utilization factor of field winding, Tref Torque command value, VB DC power voltage, Vdref1 First d-axis voltage command value, Vqref1 First q-axis voltage command value, Vdref2 Second d-axis voltage command value, Vqref2 Second q-axis voltage command value, Vfref Field voltage command value, Vne1 First required DC voltage, Vne2 Second required DC voltage, Vnef Required DC voltage of field winding, Vnecm Common required DC voltage, Vrev Common voltage control value, Vmax Upper limit value, Vmin Lower limit value

What is claimed is:

1. A controller of rotary electric machine which controls one rotary electric machine which has plural sets of windings via switching devices, the controller of rotary electric machine comprising:
   a current detector that, for each set, detects a current flowing into the winding;
   a current command calculator that, for each set, calculates a current command value flowing into the winding;
   a voltage command calculator that, for each set, calculates a voltage command value applied to the winding, based on the current command value and a current detection value;
   a switching controller that, for each set, controls on/off the switching device, based on the voltage command value; and
   a voltage control value calculator that calculates, for each set, a required DC voltage which is a minimum DC power voltage required for applying a voltage according to the voltage command value to the winding, based on the voltage command value, calculates one common required DC voltage which is common to all sets, based on all sets of the required DC voltages, and changes a common voltage control value so that the common required DC voltage approaches a DC power voltage supplied to the switching devices,
   wherein the current command calculator changes each set of the current command value, based on the common voltage control value.

2. The controller of rotary electric machine according to claim 1, wherein the voltage control value calculator calculates a maximum value in all sets of the required DC voltages as the common required DC voltage.

3. The controller of rotary electric machine according to claim 1, wherein the plural sets of windings are plural sets of three-phase windings provided in a stator of the rotary electric machine.

4. The controller of rotary electric machine according to claim 3, wherein the voltage command calculator, for each set, calculates the voltage command values of three-phase AC applied to the three-phase winding, based on the current command value and the current detection value,
   wherein the voltage control value calculator, for each set, calculates a line voltage effective value of the voltage command values of three-phase AC, and calculates the required DC voltage by dividing the line voltage effective value of the voltage command values of three-phase AC by a preliminarily set maximum voltage utilization factor.

5. The controller of rotary electric machine according to claim 1, wherein the plural sets of windings are 1 set or plural sets of three-phase windings provided in a stator of the rotary electric machine, and 1 set of field winding provided in a rotor of the rotary electric machine.

6. The controller of rotary electric machine according to claim 5, wherein the voltage command calculator calculates, for the field winding, the voltage command value of one-phase DC applied to the field winding, based on the current command value and the current detection value, and calculates, for each set of the three-phase winding, the voltage command values of three-phase AC applied to the three-phase winding, based on the current command value and the current detection value,
   wherein the voltage control value calculator calculates, for the field winding, the required DC voltage by dividing the voltage command value of one-phase DC by a preliminarily set maximum voltage utilization factor of field winding, calculates, for each set of the three-phase winding, a line voltage effective value of the voltage command values of three-phase AC, and calculates, for each set of the three-phase winding, the required DC voltage by dividing the line voltage effective value of the voltage command values of three-phase AC by a preliminarily set maximum voltage utilization factor.

7. The controller of rotary electric machine according to claim 6, wherein the voltage control value calculator lower-limits the common voltage control value by a preliminarily set lower limit value,
   wherein when the common voltage control value decreases, the current command calculator changes each set of the current command value to a side where each set of the required DC voltage decreases; and
   when the common voltage control value is lower-limited by the lower limit value, the current command calculator sets the current command value of the field winding to 0, and sets each set of the current command value of the three-phase winding to a value corresponding to a center point of a voltage limit ellipse when current of the field winding is 0.

8. The controller of rotary electric machine according to claim 1, wherein the voltage control value calculator upper and lower limits the common voltage control value by preliminarily set upper limit value and lower limit value; and
   when upper-limiting the common voltage control value by the upper limit value or lower-limiting by the lower limit value, the voltage control value calculator performs anti wind-up processing that does not change the common voltage control value.

9. The controller of rotary electric machine according to claim 1, wherein the current command calculator, for each set, calculates the current command value corresponding to at least the present common voltage control value, by referring to map data in which a relationship at least between the common voltage control value and the current command value is preliminarily set.

* * * * *